Aug. 2, 1938.    W. T. HURTT    2,125,446
BEARING
Filed Oct. 1, 1936

WITNESS
E. C. Leiding

INVENTOR
William T. Hurtt
BY
William R. Coley
ATTORNEY

Patented Aug. 2, 1938

2,125,446

UNITED STATES PATENT OFFICE 2,125,446

BEARING

William T. Hurtt, Wilkinsburg, Pa.

Application October 1, 1936, Serial No. 103,551

2 Claims. (Cl. 308—36.2)

My invention relates to bearings and particularly to fluid-lubricated bearings for apparatus of various characters.

One object of my invention is to prevent contaminating impurities from entering a bearing housing from the outside and at the same time preventing leakage of lubricant from the bearing proper.

Another object of my invention is to provide fluid pressure means, preferably of a low pressure pneumatic type, to prevent, either separately or simultaneously, ingress along a rotatable member such as a journal to a portion of a bearing structure or housing, particularly the portion adjacent the end of the bearing member, from either direction.

Another object of my invention is to provide a housing having a cavity next to a portion of a bearing member enclosed thereby and introduce fluid under pressure, preferably low pressure gas, into the cavity for sealing out water or other foreign matter and sealing in lubricating material for the bearing.

A further object of my invention is to provide a device of the character just set forth, together with simple and effective apparatus for venting such fluid or gas under pressure to prevent an accumulation of pressure.

While my present invention is particularly adapted for application to rolling mill bearings, I desire it to be understood that other bearings and similar structures may also embody my invention to advantage.

Other objects of my invention will become evident from the following detailed description, taken in conjunction with the accompanying drawing, wherein.

Figure 1:
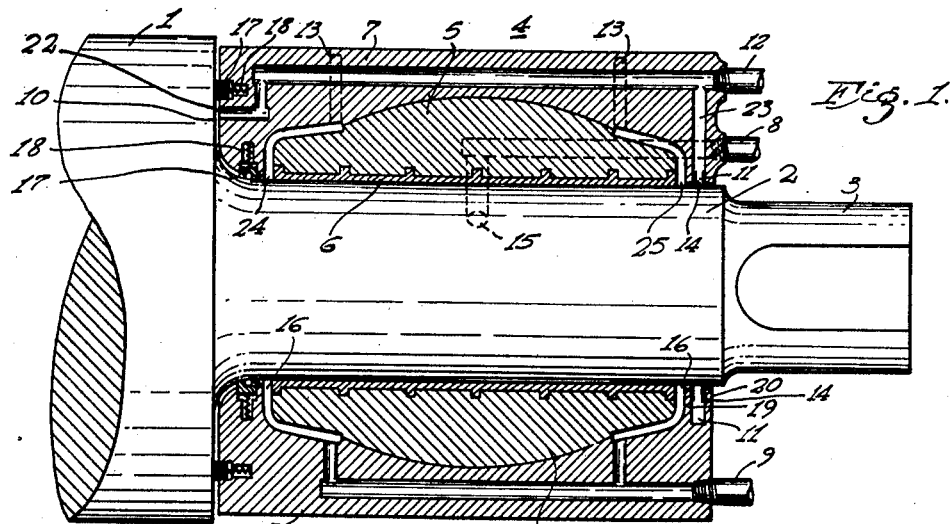
Figure 1 is a view, partially in section, of a bearing structure and rotatable member organized in accordance with my invention.
Figure 3:
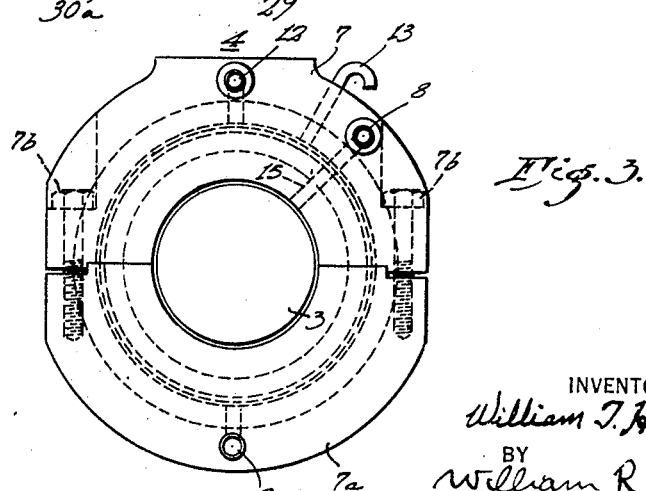
Fig. 3 is an end view of the apparatus shown in the preceding figures.

Referring to the drawing, the structure here shown comprises, in the case of Figs. 1 and 3, a roll 1 for rolling mill application, for example, having a neck or journal 2 and which may have a projecting end portion 3 of a usual character. A bearing structure 4 supports the journal 2, being preferably of a sleeve type as indicated at 5, and outer housing sections proper 7 and 7a therefor may be secured in place by suitable bolts 7b, as shown in Fig. 3. While I have shown, for purposes of simple illustration, a two-piece housing, I desire it to be understood that a single-piece or other form of housing may be used, if desired.

A suitable oil inlet 8 and oil outlet 9 for the bearing are provided, as hereinafter more fully described, and, in particular, a cavity or opening 10 is provided at the left-hand end of the journal and another cavity or opening 11 at the right-hand end thereof for effecting the application of low pressure air or other gas from a suitable inlet 12, such air or gas passing from said cavities into the main part of the housing and being vented through pipes or openings 13.

The bearing 5 may be of any well known type including a babbitted or other suitable surface 6 for contacting the journal 2, while the housing sections 7 and 7a may also be of a familiar character, with the exception of the provision for the inlet of air, gas or other fluid under pressure to the cavities 10 and 11. It will be understood that my invention may readily be incorporated, if desired, in any other form of bearing such as roller or ball bearings.

The oil inlet 8 leads in any suitable way through the housing section 7 and bearing 5 to one or more openings 15 (only one being shown) adjacent to the journal 2, this oil inlet passage being preferably located, as shown, in the upper section of the bearing structure, while the oil outlet 9 is associated with suitable passages 16 at opposite ends of the bearing to permit drainage through such passages and through the common passage in the housing that communicates with the oil outlet 9. In this way, suitable circulation of oil, which may be purified as usual before being recirculated, is provided. Since the oil circulating system constitutes no part of my present invention, no further description thereof is deemed to be necessary.

In order to provide the air pressure cavity 10 at the left-hand side of the housing structure 7, I have provided a plurality of suitable retainers 17 which, together with backing springs 18, fit into suitable recesses in one vertical end surface and one horizontal end surface of the housing section 7, thereby closing off a space designated as 10 with which the air or gas inlet 12 communicates through suitable passages in the bearing housing, the end of such passages communicating with the cavity 10, as indicated by the reference character 22. The cavity 10 is preferably annular in character, extending entirely around the roll and roll neck, although, if desired, this cavity might extend only part of the way around these members or separate spaced cavities 10 might be employed. The retainers 17 may be as shown in Fig.

1, or may be of any other familiar character, and may be made of soft metal, leather, raw hide, fiber, carbon, flax or felt, for example, thus serving to permit only a minimum of air leakage from the cavity 10.

At the other or open end of the bearing, another form of annular cavity 11 is provided, whereby two annular flanges 19 and 20 are formed, preferably entirely surrounding the journal 2. The flange 19 thus separates oil outlet passage 16 from the cavity 11, while the flange 20 separates cavity 11 from the outside atmosphere. Fluid under pressure, preferably air, is admitted to the cavity 11 from air inlet 12 and passage 23 in the bearing housing section 7. Suitable retainers, such as leather strips 14, bolted or otherwise secured to the walls of cavity 11, may also be installed to permit only a minimum of air leakage out of the cavity.

To prevent an accumulation of pressure within the central portion of bearing housing, passages 24 and 25 communicate with the surface of the journal 2 at the ends of the bearing 5 and extend upwardly through the housing section 7 to communicate with the respective outlets 13 which are suitably constructed, as by being bent backward, as shown, to deflect any foreign matter such as a spray of water, thus preventing it from entering the bearing housing.

The operation of my invention may be described as follows: Suitable fluid under low pressure, preferably air, is admitted to pipe 12 during the operation of the illustrated roll, thus providing a steady, although minimum, leakage of air past the two retainers 17 (in the case of cavity 10) to the atmosphere in the one direction and to the passage 24 in the other direction; and similarly with respect to retainers 14 in the case of cavity 11. In this way, water or other foreign matter from the outside is prevented from entering the housing, since the flow of air is in the opposite direction, and by the same token, the leakage of oil or other lubricant out of the bearing housing is prevented, since the flow of air is likewise in such a direction as to prevent this. An accumulation of fluid pressure within the central portion of the bearing housing is prevented by reason of the vents 13 which suitably discharge such fluid or air to the outside atmosphere.

Figure 2:
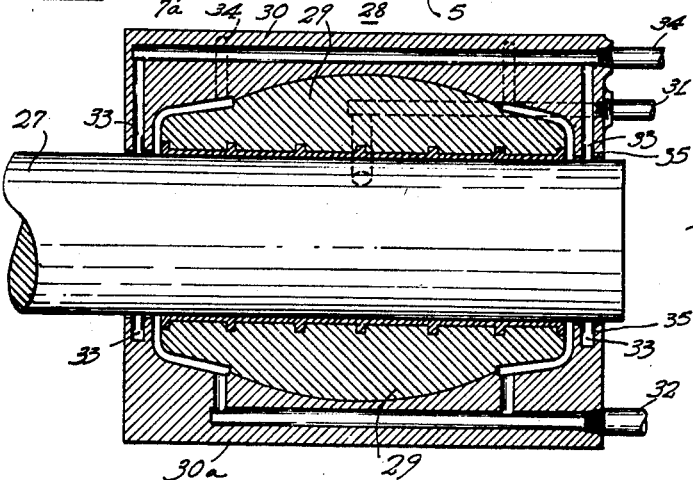
Fig. 2 is a similar view of a modified form of the invention.

The bearing structure shown in Fig. 2 is of a similar character comprising a shaft or axle 27 which is enclosed by a bearing structure 28 including a bearing section proper 29 and outer housing sections proper 30 and 30a. As in the case of the structure shown in Fig. 1, an oil inlet pipe 31 with suitable internal passages and an oil outlet pipe 32 with suitable internal passages are provided.

Annular cavities 33 are provided at each end of the housing, thus corresponding to the cavities 11 shown in Fig. 1, these cavities communicating with air inlet pipe 34 for the purpose already set forth. Suitable retainers 35, similar to the retainers 14 of Fig. 1, are preferably secured to the walls of cavities 33, to permit only a minimum of leakage past said retainers.

It will be seen that I have thus provided a bearing structure which may be readily and inexpensively applied to various forms of journals or rotatable members of the fluid-lubricated type, and by supplying preferably low pressure air to cavities within the bearing housing, foreign matter may be kept from entering the bearing and at the same time the leakage of lubricating oil from the housing may be prevented.

While I have shown two forms of my invention, I do not wish to be limited to the specific structures or arrangements of parts thereof, as various other modifications of my invention may be made without departing from the spirit and scope thereof. I desire, therefore, that only such limitations shall be imposed as are indicated in the appended claims.

I claim as my invention:

1. The combination with a rotatable member and a lubricated bearing therefor having a cavity therein next to a surface of said member, of retainers contacting said member to form the ends of said cavity, and means for introducing gaseous fluid under pressure into said cavity, said retainers permitting a minimum of leakage of fluid along said member from said cavity.

2. The combination with a rotatable member and a lubricated bearing therefor having a cavity therein next to a surface of said member, of retainers contacting said member to form the ends of said cavity, means for introducing fluid under pressure into said cavity, said retainers permitting a minimum of leakage of fluid from said cavity, and means for venting leakage fluid from the interior of said bearing to prevent an accumulation of pressure therein.

WILLIAM T. HURTT.